United States Patent [19]

Boyer

[11] 4,018,682

[45] Apr. 19, 1977

[54] FREEZE-THAW METHOD FOR REDUCING MINERAL CONTENT OF A CLAY-WATER MIXTURE

[75] Inventor: Jackson S. Boyer, Wilmington, Del.

[73] Assignee: Sunoco Energy Development Co., Dallas, Tex.

[22] Filed: Sept. 8, 1975

[21] Appl. No.: 610,953

[52] U.S. Cl. .................................. 210/71; 62/532; 159/4 F; 159/48 R; 159/DIG. 5; 208/11 LE

[51] Int. Cl.² ...................... B01D 35/18; C02B 1/02

[58] Field of Search ............... 208/11; 210/70, 71, 210/59, 60, 63; 159/48 R, DIG. 5, 2, 3, 4 F; 62/58, 532

[56] References Cited

UNITED STATES PATENTS

| | | | |
|---|---|---|---|
| 2,703,782 | 3/1955 | Regan et al. | 210/71 |
| 2,780,281 | 2/1957 | Reinert | 159/4 F |
| 3,151,054 | 9/1964 | Laying | 210/59 |
| 3,620,776 | 11/1971 | Mishkin et al. | 159/48 R |
| 3,751,358 | 8/1973 | Elliott | 210/59 |

*Primary Examiner*—Bernard Nozick
*Assistant Examiner*—Frank Sever
*Attorney, Agent, or Firm*—J. Edward Hess; Donald R. Johnson; Stanford M. Back

[57] ABSTRACT

A method for reducing the clay content of a colloidal clay-water mixture which comprises combining the mixture with air at superatmospheric pressure and thereafter expelling the mixture in the form of small droplets at atmospheric pressure at a temperature below 32° F. to form synthetic snow. Thereafter synthetic snow can be melted to recover water containing reduced mineral content. The invention is particularly applicable to sludge associated with the hot water extraction method for recovering bitumen from tar sands.

7 Claims, No Drawings

FREEZE-THAW METHOD FOR REDUCING MINERAL CONTENT OF A CLAY-WATER MIXTURE

BACKGROUND OF THE INVENTION

The present invention is related to a method for separating water from a colloidal clay-water mixture. The present invention particularly relates to a method for reducing the sludge content of a waste water retention pond associated with the hot water method of extracting bitumen from tar sands.

Tar sands, which are also known as oil and bituminous sands are siliceous materials which are impregnated with a heavy petroleum. The largest and most important deposits of the sands are the Athabasca sands, found in northern Alberta, Canada. These sands underlay more than 13,000 square miles at a depth of 0 to 2,000 feet. Total recoverable reserves after extraction and processing are estimated at more than 300 billion barrels. Tar sands are primarily silica, having closely associated therewith an oil film which varies from about 5 to 21% by weight, with a typical content of 13 weight percent of the sand. The oil is quite viscous — 6° to 10° API gravity — and contains typically 4.5% sulfur and 38% aromatics. In addition to the oil and sand components, tar sands contain clay and silt in quantities of from 1 to 50 weight percent, more usually 10 to 30%. The sands also contain a small amount of water, in quantities of 1 to 10% by weight, in the form of a film around the sand grains.

Several basic extraction methods have been known for many years for the separation of oil from the sands. In the socalled "cold water" method, the separation is accomplished by mixing the sands with a solvent capable of dissolving the bitumen constituent. The mixture is then introduced into a large volume of water, water with a surface agent added, or a solution of a neutral salt in water, which salt is capable of acting as an electrolyte. The combined mass is then subjected to a pressure or gravity separation.

In the hot water method, as disclosed in Canadian Pat. No. 841,581 issued May 12, 1970, the bituminous sands are jetted with steam and mulled with a minor amount of hot water at temperatures of 170° to 190° F, and the resulting pulp is then dropped into a turbulent stream of circulating hot water and carried to a separation cell maintained at a temperature of about 185° F. In the separation cell, sand settles to the bottom as tailings and oil rises to the top in the form of a froth. An aqueous middlings layer comprising clay and silt and some oil is formed between these layers. This basic process may be combined with a scavenger step for further treatment of the middlings layer obtained from the primary separation step to recover additional amounts of oil therefrom. The middlings layer, either as it is recovered from the primary process or as it is recovered after the scavenger step, comprises water, clay and oil. The oil content is, of course, higher in middlings which have not undergone secondary scavenger steps.

In the hot water extraction process as mentioned above, waste water streams are removed from the process plant as a slurry of about 35 to 75%, typically 45%, solids by weight. Included in the slurry in sand, silt, clay and small quantities of bitumen. In this specification, sand is siliceous material which will not pass a 325 mesh screen. Silt will pass 325 mesh and is smaller than 45 microns but is larger than two microns. Clay is material smaller than two microns including some siliceous material of that size.

Because this waste water contains oil emulsions, colloidally dispersed clay with poor settling characteristics and other contaminents, water pollution considerations prohibit discarding the effluent into rivers, lakes or other natural bodies of water. The disposal of the waste water streams has therefore presented a problem.

Currently, waste water is stored in retention ponds which involve large space requirements and the construction of expensive enclosure dikes. A portion of the water in the waste water stream can be recycled back into the hot water extraction process as an economic measure to conserve both heat and water. However, experience has shown that the dispersed silt and clay content of the recycled water can reduce primary froth yield by increasing the viscosity of the middlings layer and retarding the upward settling of oil flecks. When this occurs, the smaller oil flecks and those that are more heavily laden with mineral matter stay suspended in the water of the separation cell and are removed from the cell with the middlings layer.

Waste water streams discharged from the hot water process for extracting bitumen from tar sands contains a substantial amount of mineral matter, much of which is colloidally dispersed and does not settle very readily when stored in the retention pond. The lower layer of the retention pond can contain up to 50% dispersed mineral matter comprised substantially of clay and silt as well as up to 25% bitumen. This part of the pond water is normally referred to as sludge. Sludge is not suitable for recycling to the hot water extraction process for the reason that its addition into the separation cell of the scavenger cell at the normal inlet means would raise the mineral content of the middlings of the cell to the extent that recovery of bitumen would be substantially reduced. Generally, the settling which does take place in the pond provides a body of water in which the concentration of mineral matter increases substantially from the surface of the pond to the bottom thereof.

As one example, a waste water retention pond associated with a hot water process for extracting bitumen from 140,000 to 150,000 tons of tar sands per day and having a surface area of about 1,000 acres and an average depth of 40 feet can be characterized somewhat as follows:

a. From the surface of the pond to a depth of about 15 feet the mineral concentration which is primarily clay is found to be about 0.5 to 5.0 weight percent. This pond water can normally be recycled to a hot water extraction process without interfering with the extraction of bitumen from tar sands.

b. The layer of water in the pond between 15 and 25 feet from the surface contains between 5.0 and 20% mineral matter. This water, if recycled to the separation cell feed with fresh tar sands, would increase the mineral content of the middlings portion of the cell to the point that little bitumen would be recovered.

c. Finally the section of the pond between 25 feet and the bottom of the pond contains 20 to 50% mineral matter and is normally referred to as sludge.

Many procedures for treating waste water associated with the extraction of bitumen from tar sands have been proposed. For example, Canadian Pat. No. 841,582 issued May 12, 1970 to R. A. Baillie claims a method for recovering additional bitumen from waste water streams recovered from a tar sands hot water extraction process comprising settling the stream and removing floating bitumen from the surface thereof.

U.S. Pat. No. 3,751,358 issued Aug. 7, 1973 discloses a method for separating clarified water from a clay-water mixture which comprises agglomerating the clay in the mixture and threafter freezing then thawing the mixture to separate clarified water therefrom.

Canadian Pat. No. 824,968 issued Oct. 14, 1969 to Robert A. Baillie discloses a treatment of waste water from a hot water extraction process which comprises percolating the waste water through an inclined sand pile to incorporate the clay and silt of the waste water into the interstices of the sand pile.

Canadian Pat. No. 866,266 issued March 16, 1971 to Raymond et al. discloses removing bitumen from waste water streams by incorporating viable microorganisms therein which subsequently results in clay settling. Canadian Pat. Nos. 873,317 issued June 16, 1971 to Baillie et al.; 873,318 issued June 16, 1971 to Baillie et al.; 873,853 issued June 22, 1971 to Baillie et al.; 874,418 issued June 29, 1971 to Camp; 874,419 issued June 29, 1971 to Steinmetz; 878,656 issued Aug. 17, 1971 to Seitzer et al.; 882,668 issued Oct. 5, 1971 to Camp; 890,804 issued January 18, 1972 to Fear et al.; 891,472 issued Jan. 25, 1972 to Camp; 892,548 issued Feb. 8, 1972 to Hepp et al. and 917.586 issued Dec. 26, 1972 to Paulson each disclose methods for treating waste water streams associated with the hot water method for extracting bitumen from tar sands. Yet none of these proposals provides an economically attractive process for treating hot water extraction process waste waters associated with the recovery of bitumen from tar sands. By the method of the present invention an improved process for resolving this problem is provided.

DESCRIPTION OF THE INVENTION

This invention relates to a method for separating water from a colloidal mixture of clay and water. Specifically, the present invention relates to a method for reducing the clay and silt content of waste water streams associated with the aqueous extraction of bitumen from tar sands. More specifically, the present invention comprises a procedure whereby a colloidal dispersion of clay and silt in water is converted into synthetic snow, thereby separating at least a part of the minerals from the water component of the mixture. Thereafter the snow is melted to provide water decreased in mineral content.

The present invention comprises a procedure whereby a mixture of clay and silt dispersed in water such as that found in a waste water retention pond associated with the hot water extraction of bitumen from tar sands is transferred at superatmospheric pressure and thereafter expelled as small droplets into the atmosphere at a temperature below 32° F. whereby the water fraction of the mixture forms small snow-like crystals thus separating the water from the clay and silt. The water crystals of the stream fall to the ground as synthetic snow, and melt when the temperature rises above 32° F. The water obtained from the melted snow no longer contains the colloidal dispersion of minerals. Much of the clay and silt remain in the area of deposit and the water is free to drain from the area and be recovered.

Generally the present invention is a freeze-thaw procedure whereby water is separated from colloidal dispersions of clay and silt in water. Specifically, the present method of invention is directed towards solving a problem related to the hot water extraction of bitumen from tar sands. As previously noted, one of the undesired products of a hot water extraction procedure for recovering bitumen from tar sands is sludge stored in a retention pond. Reduction of this sludge is very important to this process. The present invention provides one means of accomplishing this end.

As a general procedure the temperature of the mineral-water mixture to be treated is adjusted to be in the range of 32° to 40° F and preferably to a range of 32° to 35° F. The nearer the temperature of the feed water is to freezing the easier it is to freeze. Thus a feed water stream at 32° F. can be synthesized into snow at a higher rate than an equivalent stream at a higher temperature processed under otherwise identical conditions. Lowering the temperature of the feed stream can be accomplished by passing the mixture through a heat exchange means of the type generally available for cooling aqueous streams. Thereafter the mixture is pumped through a pressure vessel such as a pipe and preferably admixed with compressed air at a pressure of at least 25 p.s.i.g. and more preferably in the range of 25 p.s.i.g. to 200 p.s.i.g. The pressurized mineral-water mixture of air-mineral-water mixture is thereafter passed through a restriction such as a nozzle which aids in creating small droplets of the components in the stream.

When compressed air is used and the air-mineral-water mixture is expelled from the nozzle into an atmosphere of a substantially lower pressure, the air component of the mixture rapidly expands to effectively cool and atomize at least part of the water in the mixture. Freezing the atomized droplets causes the mineral particles therein to be concentrated as the water fraction freezes so that the frozen particles obtained contain one part comprised substantially of frozen water in the form of ice crystals with the remaining part comprised of a mineral concentrate frozen in the ice particle. By this freezing process the colloid dispersion is broken to thereby release mineral free water when the ice crystals melt.

The atmosphere into which the mixture is expelled is maintained at a temperature below 32° F and preferably in the range of +10° F to −50° F freeze the cooled atomized water from the mixture into small ice crystals which give the general appearance of snow. When the ambient temperature rises above 32° F the synthetic snow melts and can drain away, thereby completing the separation of the water from the mineral-water mixture.

In a practical sense, sludge from a retention pond is treated by the method of the present invention during the winter months of the year when the ambient temperature is below freezing at least part of the time, thereby foregoing the need to artificially freeze the water. Areas where tar sands exist and extremely cold weather also occurs, such as northern Alberta, Canada, are particularly suitable for the practice of the present invention.

Normally, the synthetic snow produced by this method is deposited over open ground in the winter and subsequently melts and runs off as ground water in the spring and summer leaving most of the mineral matter deposited on the ground where it was first placed. Although not critical to the invention it is preferable to use sludge containing 40 weight percent or less dispersed minerals. Thus a sludge with a higher mineral concentration is more easily processed if it is diluted with prior to treatment. By the process of this invention mineral matter taken from the ground and stored in a retention pond is returned to the ground and thereby removed from water which can be subsequently drained by natural runoff or recovered for reuse in a hot water extraction process.

Artificial snow is made by discharging water or preferably an air and water mixture under pressure through a constriction into a freezing atmosphere at lower pressure. Snow can be made at any temperature below freezing; however, ambient air temperatures below 10° F are preferred with temperatures in the range of +10° F to −50° F being preferred. It is preferred that the mineral-water mixture used as feed for making artificial snow is supplied at a temperature slightly above 32° F. Normally, the mineral-water feed mixture should be at a temperature in the range of about 32.5° to 36° F but higher temperatures can of course be used.

The mineral-water feed mixture can be supplied at pressure in the range of 25 to 200 p.s.i.g. Air can also be supplied at pressure in the range of 25 to 200 p.s.i.g. The air and the mineral-water mixture can be admixed at a pressure in the range of 25 to 200 p.s.i.g. and discharged into a freezing atmosphere through a nozzle which atomizes the mixture. One type of nozzle suitable for use in the process of the present invention is disclosed in Canadian Pat. No. 513,432 issued May 31, 1955. Any nozzle design which provides the necessary dispersion of air and water is suitable for use in this process.

As one mode of the preferred process of the present invention the following example is provided.

An aqueous sludge having a temperature of about 60° F is withdrawn from a retention pond which stores waste water associated with the hot water extraction of bitumen from tar sands. The sludge is characterized as containing 4.3% hydrocarbons, 0.9% sand, 15.8% silt, 7.1% clay and 71.3% water. The sludge is passed through a heat exchanging means and recovered at a temperature of about 33° F. The sludge is thereafter fed at a rate of 100 USGPM at a pressure of 150 p.s.i.g. to a snow gun approximately 4 feet long and 4 inches in diameter having a nozzle on the outlet end 2.5 inches long and a 1.25 inch diameter opening. The snow gun contains an inlet means on one end for the addition of sludge. Air is also added to the sludge in the gun at 150 p.s.i.g. and about 700 cubic feet per minute. The ambient temperature of the air is at about −6° F. Artificial snow is formed from the sludge by the rapid expansion of the sludge air mixture being expelled from the nozzle of the gun. Upon melting, the artificial snow produces water substantially reduced in mineral content.

When practicing the present invention it is preferable to remove as much of the hydrocarbon material as possible from the sludge if the feed contains more than 1 percent hydrocarbons in the form of tarry bitumen. The bitumen forms agglomerates which on occasion can clog small openings in nozzles.

The rate at which sludge can be treated by this procedure is dependent upon ambient temperatures and equipment used. Normally the lower the temperature the higher the feed rate of sludge that is possible. Sludge suitable for use in the process of the present invention should contain no more than 40% solids and preferably less than 30% total solids. Pond water containing less than 5% minerals is normally suitable for reuse as fresh process water and therefore does not need to be clarified by the process of this invention.

Thus, the present invention comprises a method for reducing the mineral content of a colloidal clay-water mixture comprising:

Expelling a colloidal clay-water mixture at a pressure of at least 25 p.s.i.g. through a restriction into an atmosphere maintained at a pressure lower than the pressure of said mixture and at a temperature below 32° F to form ice crystals from said mixture and thereafter melting said ice crystals to recover water having reduced mineral content.

Preferably the present invention comprises a method for reducing the mineral content of a colloidal clay-water mixture comprising:

a. admixing colloidal clay-water mixture containing at least 5 weight percent dispersed clay with air at a pressure of at least 25 p.s.i.g.;
b. rapidly expanding said air-water mixture into an atmosphere of a lower pressure and having a temperature below 32° F to cause the water in said mixture to atomize and freeze into small ice crystals; and
c. melting said ice crystals to recover water having reduced mineral content.

More specifically, the present invention provides a method for reducing a sludge content of a retention pond containing waste waters derived from a hot water extraction process for recovering bitumen from tar sands. Said sludge comprising 5 to 50 percent colloidally dispersed mineral matter in water which method comprises:

a. withdrawing sludge from said pond and admixing said sludge with air at a pressure of at least 25 p.s.i.g. and preferably in the range of 25 to 200 p.s.i.g.;
b. rapidly expanding the air-sludge mixture in an atmosphere having a lower pressure and temperature below 32° F and preferably below 10° F and more preferably below 0° F, thereby causing the water in said mixture to atomize and form ice crystals; and
c. melting said ice crystals to provide water substantially free of colloidally dispersed minerals.

The invention claimed is:

1. A method for reducing the clay content of a colloidal clay-water mixture which comprises:
   a. combining said mixture with air at a pressure of at least 25 p.s.i.g.;
   b. rapidly expanding the air-colloidal clay-water mixture by passing said mixture through a constriction into an atmosphere of sufficiently lower pressure to cause the water in the mixture to atomize, and at a temperature below 32° F to cause the atomized water to freeze into ice crystals containing said clay in a concentrated, non-colloidal form;
   c. spraying said clay-containing ice crystals on the ground; and
   d. melting said ice crystals containing said non-colloidal clay whereby the melted ice percolates through the ground and the clay remains behind to provide a direct separation of water and clay.

2. A method according to claim 1 wherein the pressure of step (a) is in the range of 25 p.s.i.g. to 200 p.s.i.g.

3. A method according to claim 2 wherein said clay-water mixture contains between 5.0 and 40.0 weight percent colloidally dispersed clay.

4. A method according to claim 3 wherein said temperature is in the range of +10° to −50° F.

5. A method according to claim 1 wherein said clay-water mixture contains between 5.0 and 40.0 weight percent colloidally dispersed clay.

6. A method according to claim 1 wherein said temperature is in the range of +10° F to −50° F.

7. A method of treating aqueous sludge derived from a retention pond used to store waste water derived from a hot water process for recovering bitumen from the tar sands, said sludge containing between 5.0. and 40.0 weight percent colloidally dispersed clay to provide water having a lower clay content than the sludge comprising:

a. providing said sludge from said pond at a temperature in the range of 32° to 50° F;
b. combining the sludge with air at a pressure of at least 25 p.s.i.g.;
c. passing said air-sludge mixture through a constriction into an atmosphere having sufficiently lower pressure to cause the water in the mixture to atomize, and having a temperature below 32° F to cause the atomized water to form ice crystals containing said clay in a concentrated, non-colloidal form;
d. spraying said clay-containing ice crystals on the ground; and
e. melting said ice crystals containing said non-colloidal clay whereby the melted ice percolates through the ground and the clay remains behind to provide a direct separation of water and clay.

* * * * *